Oct. 28, 1930.  F. LAWACZECK  1,779,549
POWER PLANT
Filed March 16, 1927
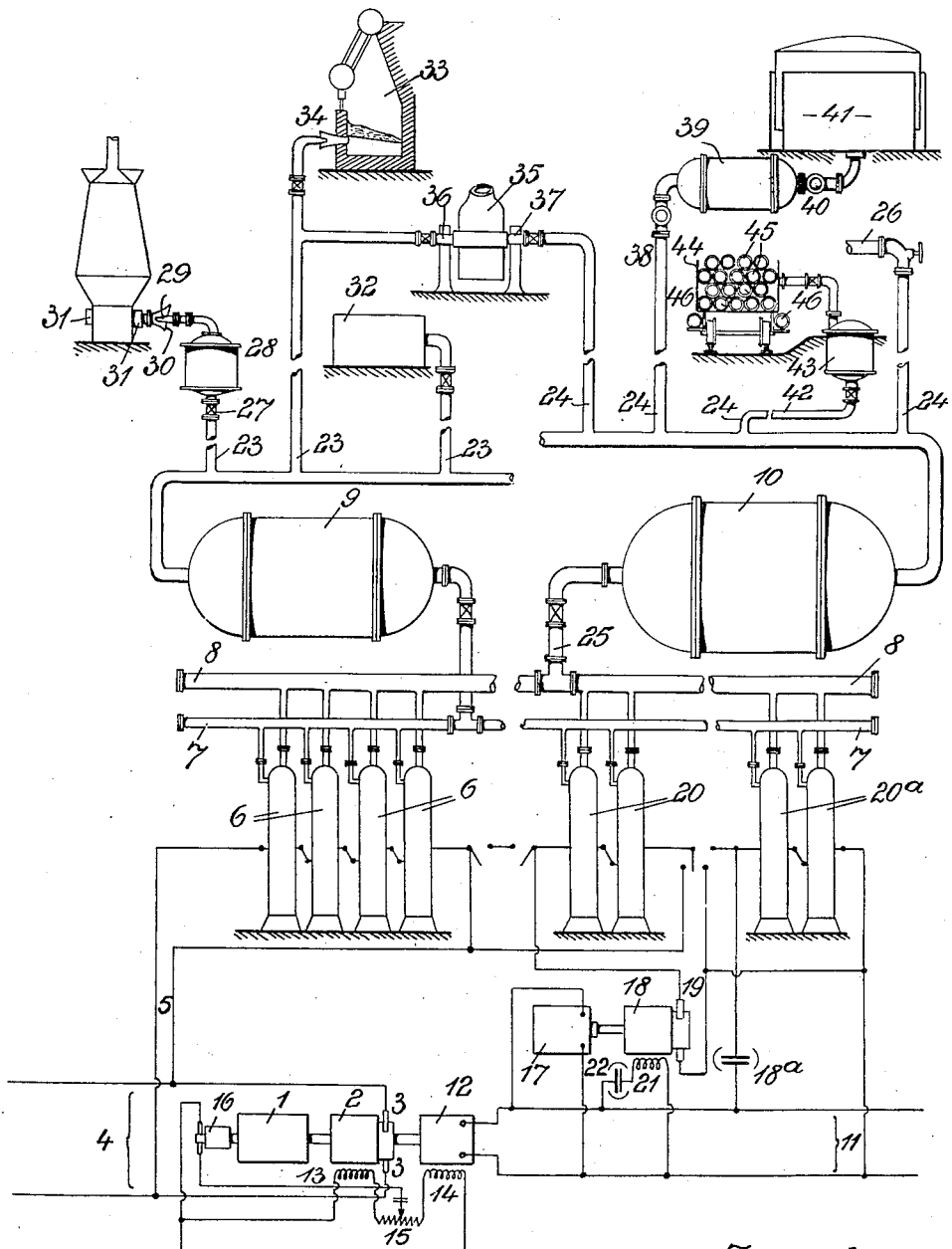
Inventor:
Franz Lawaczeck
by Kleinhaustig
Atty.

Patented Oct. 28, 1930

1,779,549

UNITED STATES PATENT OFFICE

FRANZ LAWACZECK, OF MUNICH, GERMANY, ASSIGNOR TO FIRM LAWACZECK GESELL-SCHAFT MIT BESCHRANKTER HAFTUNG, OF BERLIN, GERMANY

POWER PLANT

Application filed March 16, 1927, Serial No. 175,855, and in Germany December 30, 1922.

I have filed applications in Germany, filed December 30, 1922; Germany, filed May 16, 1924; Germany, filed January 21, 1925; Germany, filed November 13, 1925; Germany, filed December 12, 1925; Germany, filed December 17, 1925.

My invention relates to means for transforming power in a particularly economical manner. It is an object of my invention to increase the efficiency of power plants, more particularly electric plants, by making them adapted to be operated at practically uniform load. To this end I utilize the excess energy, that is, the energy for which there is no demand at certain times, for generating in a closed electrolyzer a gas, more particularly hydrogen and, as a by-product, oxygen. The gas is generated without extra cost at any desired pressure, and in this manner the excess energy is stored in the form of the potential and heat energy of the gas or gases, while the plant is operated at uniform load, as desired.

According to my invention uniform load is permanently maintained independently of the existing demand and the excess energy is rendered available in a form fit to be stored and shipped immediately by generating high-pressure hydrogen in electrolytic cells under high pressure. In this manner the excess energy, that is, the energy for which there is no immediate demand, is not lost but utilized for storing energy in the form of hydrogen, and at the same time obtaining high-pressure oxygen as a by-product. The hydrogen is obtained under any pressure amounting to several hundreds or even several thousands of kilograms per cm.$^2$, as desired and without extra cost for the pressure and its energy is readily stored and shipped over long distances without substantial loss in narrow high-pressure pipe lines.

It is extremely important for the economy of this process that the generation of pressure requires no extra supply of energy whatever, for the electrolysis of a given weight of water at high pressure, say 100 kgs. per cm.$^2$ does not consume more energy than if it were performed at atmospheric pressure, as no energy is required for placing water under pressure. Consequently the pressure of the hydrogen does not involve any cost whatever and therefore the gas under pressure generated by electrolysis is, without any extra expense, endowed with the capacity of being stored to any amount and also with the energy required for shipping, the storage consuming a comparatively small space and small cost while, on the other hand, with the high pressure available gratis, the gas is readily shipped in narrow pipe lines. If a sufficiently high counter-pressure is maintained at the farther end of the pipe line, then the pipe line itself constitutes a very efficient storage means as between the ends of the pipe line only that margin of pressure is required which is necessary for overcoming the frictional resistance to the flow of gas. The wall thickness of such pipe lines may be increased beyond that of normal lines without difficulty. A pressure of about 50 kgs./cm.$^2$ suffices for overcoming the resistance to flow over very long distances. If therefore in a normal pipe line the wall thickness is calculated for an internal pressure of 1000 kg./cm.$^2$, the pipe line will be able to carry twenty times the volume which it carries at the pressure required for just overcoming the frictional resistance, viz. 50 kgs./cm.$^2$. For instance a pipe line of 1 in. inside diameter and 60 miles long is able to store the hydrogen generated within 24 hours in a 10000 k. w. plant.

Variations of pressure in the pipe line are without any importance to the consumer as it is not the comparatively small mechanical energy of the gas, but its heat value or chemical properties which are utilized.

The annexed drawing is a diagrammatic illustration of the system comprehended by this invention.

In the drawing affixed to this specification and forming part thereof a plant, in which my invention can be performed, is illustrated diagrammatically, it being understood that the plant shown is only an example for the many possibilities of reducing my invention to practice.

Referring now to the drawing, 1 is an engine of any suitable type, for instance a hydraulic or steam turbine which operates a direct-current generator 2. 3, 3 are the terminals or bus bars of the generator to which the direct-current system 4 is connected. The current not required in the system is conducted to an electrolytic high pressure battery 6 by means of wires 5 connected in parallel to the system 4. The electrodes of the several electrolyzer units may be connected in series for facilitating their connection to normal system voltage, for instance by the means described in my U. S. Patent No. 1,600,478, and the several units 6 may also be connected in series. 7 and 8 are headers for the gases generated in the units 6 from which they are separately connected under pressure, and 9 and 10 are storage reservoirs connected to the headers for oxygen and hydrogen, respectively.

In accordance with this method I obtain very valuable products in the form of electrolytic high-pressure gas. The fact that the high pressure of the gas is obtained without extra expense, enables the gas to be utilized economically for a great variety of purposes and is fundamentally important for the problem of long-distance gas pipe lines.

Heretofore, when city gas works or other industrial plants were faced by the problem of shipping the gas at high velocity it was found that this would require a very high initial pressure as the frictional resistance of the pipe lines increases very rapidly with the velocity of flow and, to generate this pressure, very large and complicated and therefore uneconomical power plants would be required. Therefore, at present, one has renounced to high velocities and the gas flows slowly under very low pressure. Considering the enormous quantities of gas flowing in a pipe line, the area of the line becomes very large and for considerations of manufacture, rusting and wear during shipping and handling and also due to external influences, their wall thickness is considerably in excess of that required by the internal pressure. It follows that the pipe line will be very heavy but its weight is not in any way utilized. Attempts to increase the pressure so as to obtain more economic pipe lines failed owing to the consideration that, notwithstanding the initial cost of the pipe line being reduced per unit of heat shipped, the expense of generating pressure still made up for the saving as its increase is much more rapid than the reduction in the cost of the pipe line.

All these difficulties are overcome by the present invention according to which the expense of generating pressure is nil, as it makes no difference whether the electrolyzer battery is operated at, say, 20 or at 1400, kg./cm.² Consequently the economic difficulties involved in the operation of long-distance gas pipe lines are overcome. As the output of enery for the dissociation of water is recovered practically completely, that is, to the amount of 80 or 90 per cent, in the heat value of the hydrogen, it makes no difference from a thermic point of view whether current or the equivalent quantity of hydrogen is shipped. On the other hand, with consideration of the very high pressures obtained free of charge by electrolysis under pressure, it is possible to greatly reduce the cross-sectional area of the pipe lines so that their weight per thermal unit is very small and therefore the cost of shipping which is only dependent on the interest and depreciation of the steel in the pipe line, is very small and a pipe line for hydrogen becomes cheaper than an electric system.

At present hydraulic power plants, even in the vicinity of large cities, are not in a position to supply the city with excess current for heating purposes, for notwithstanding the fact that the cost for generating this current is nil, the cost of a system for shipping and distributing the current is so high that such current cannot compete with coal for heating purposes. On the other hand the hydrogen which is permanently generated from say 10000 k. w. and contains 80 per cent or more of the heat energy consumed for its generation, may be shipped in a steel pipe, the cross-sectional steel area of which is smaller than the copper area of a 50000-volt line for a corresponding current. However, the copper constitutes but a part of the system, the major part of its initial cost being due to insulators, poles and the like which are not required in the case of a pipe line.

Consequently my invention renders it possible to supply the excess energy to the consumers in the shape of hydrogen under conditions which are more favorable for heating purpose than those offered by the use of coal.

Any desired number of long-distance pipe lines 23, 24 can be connected to the pipe lines 7 and 8 or preferably, as shown in the drawing, to the reservoirs 9, 10 and, if the proper back pressure is maintained at their farther ends, these lines may extend over distances of several hundreds of miles.

Before shipping the gas, its moisture is preferably separated by refrigeration at a suitable point of the pipe line or in the reservoirs 9, 10. The last traces of oxygen may be separated from the hydrogen at 25 by conducting it past catalysts or parts which are heated electrically or by other means, the traces of oxygen being combined with the hydrogen to form water which is returned to the electrolyzers.

As mentioned above, the hydrogen due to its high pressure may be shipped to any distance, so that its use is not limited to the place where it is generated, for instance a thermic power plant close to a coal mine or a hydraulic power plant in the mountains, but it may be carried to large cities or the like through high-pressure pipe lines. Such a pipe line obviously constitutes a large-size accumulator which is often able to store the supply for a full day and therefore with an electric power plant combined with a gas works as described the operation is facilitated and energy is saved not only with respect to the power plant, but also to the gas works, as gas works also suffer from the difficulties arising from the varying daily and yearly demand. As with power plants gas works must be designed for the highest demand and therefore its efficiency will be a maximum at full load, as explained with reference to the power plant, and the gas will be produced most efficiently if generated uniformly. At present considerable quantities of hydrogen are added to the gas partly for supplying peak loads and partly for diluting the gas while maintaining or even increasing its heat value. This hydrogen is at present obtained from water gas. Now the admixture of hydrogen to illuminating gas is highly desirable but it involves the drawback that poisonous carbon monoxide from the water gas is admixed to the illuminating gas, thereby creating danger to the consumers. This drawback is overcome in view of the present invention which renders it possible to dilute the illuminating gas with pure hydrogen, while at the same time, the variations in the load of both the power plant and the gas valve can be balanced in a very favorable manner owing to their being connected by the compressed hydrogen pipe line.

A gas works embodying my invention is illustrated in the drawings. 39 is a high-pressure collecting tank at the end of a pipe line 38, which may have any desired length, from a few miles to several 100 miles. It is preferable to provide at the farther end of the line such a tank from which gasometers 41 of a town system are supplied through the medium of one or more reducing valves indicated in a general way at 40.

Since the pipe line constitutes a storage chamber of very considerable volume, calculated on gas at atmospheric pressure, the gasometers 41 might be dispensed with altogether and gas under the full or a reduced pressure might be supplied directly to the consumers and its pressure be reduced by reducing valves at the places of consumption.

I wish it to be understood that I do not desire to be limited to the exact details of construction shown and described for obvious modifications will occur to a person skilled in the art.

I claim:—

1. In an electric power plant, the combination with a prime mover, a generator, and a variable load, of means for utilizing excess electric power including high pressure electrolytic apparatus and high pressure storage means, said storage means constituted by a high pressure long distance pipe line.

2. In an electric power plant, the combination with a prime mover, a generator, and a variable load, of means for utilizing the excess electric power including an electrolyzer for the generation of hydrogen and oxygen under high pressure, headers connected with said electrolyzer for the separate reception of the hydrogen and oxygen, and storage means for said gases constituted by high pressure resistant long distance pipe lines.

In testimony whereof I affix my signature.

FRANZ LAWACZECK.